(12) United States Patent
Hudson et al.

(10) Patent No.: US 6,614,451 B1
(45) Date of Patent: *Sep. 2, 2003

(54) GROUP BASED COMPUTER USE SYSTEM

(75) Inventors: Anne Elizabeth Hudson, Hunters Hill (AU); John Gilchrist Findlay, Cheltenham (AU); Jonathon Peter Wolfe, Lillyfield (AU)

(73) Assignee: Grouputer Corporation Pty Ltd (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/211,971
(22) PCT Filed: Oct. 23, 1992
(86) PCT No.: PCT/AU92/00572
§ 371 (c)(1),
(2), (4) Date: Jun. 1, 1994
(87) PCT Pub. No.: WO93/08536
PCT Pub. Date: Apr. 29, 1993

(30) Foreign Application Priority Data

Oct. 24, 1991 (AU) .................................................. PK9070
Jun. 11, 1992 (AU) .................................................. PL2884

(51) Int. Cl.⁷ .............................................. G06K 15/00
(52) U.S. Cl. ....................................... 345/759; 345/753
(58) Field of Search ................................. 395/155, 156, 395/157, 158, 159, 160, 161, 162, 114, 115, 326, 333, 334, 340, 330; 345/326, 333, 334, 340, 330, 341, 342, 332, 331

(56) References Cited

U.S. PATENT DOCUMENTS

| 4,974,173 A | | 11/1990 | Stefik et al. ................. 364/521 |
|---|---|---|---|
| 5,008,853 A | | 4/1991 | Bly et al. .................... 364/900 |
| 5,119,319 A | * | 6/1992 | Tanenbaum ................. 364/514 |
| 5,159,685 A | * | 10/1992 | Kung ......................... 395/575 |
| 5,195,086 A | * | 3/1993 | Baumgartner et al. ...... 395/329 |
| 5,206,934 A | * | 4/1993 | Naef, III .................... 395/200 |
| 5,220,657 A | * | 6/1993 | Bly et al. .................... 395/425 |
| 5,255,358 A | * | 10/1993 | Busboom et al. ........... 395/153 |
| 5,280,583 A | * | 1/1994 | Nakayama et al. ......... 395/200 |

(List continued on next page.)

FOREIGN PATENT DOCUMENTS

| EP | 475868 | 3/1992 |
|---|---|---|
| EP | 475871 | 3/1992 |
| EP | 497022 | 8/1992 |
| GB | 2173613 | 10/1986 |
| GB | 9117458 | 9/1991 |
| GB | 9117459 | 9/1991 |
| GB | 2247549 | 3/1992 |
| JP | 4095450 | 3/1992 |

*Primary Examiner*—Steven Sax
(74) *Attorney, Agent, or Firm*—Burns, Doane, Swecker & Mathis, L.L.P.

(57) ABSTRACT

A facilitation system to facilitate communication amongst a number of persons having access to data input devices. The system has a host computer, a control program stored in the computer and operable to permit data entered on any of the input devices to be transferred to the computer, and at least one display. Each display means is configured to display a common single image generated by the computer for simultaneous viewing by each of the persons. The single image includes a plurality of display areas, with each input device having a corresponding display area wherein data simultaneously and separately input via each input device is simultaneously displayed in the corresponding display area. At least one control device is connected to the computer and operable to select specific data displayed in any of the display areas and to both transfer and display the specific data in any of the display areas.

33 Claims, 9 Drawing Sheets

U.S. PATENT DOCUMENTS

| | | | | |
|---|---|---|---|---|
| 5,287,519 A | * | 2/1994 | Dayan et al. | 395/700 |
| 5,408,333 A | * | 4/1995 | Kojima et al. | 358/400 |
| 5,442,788 A | * | 8/1995 | Bier | 395/650 |
| 5,493,692 A | * | 2/1996 | Theimer et al. | 455/26.1 |
| 5,513,126 A | * | 4/1996 | Harkins et al. | 364/514 A |
| 5,522,024 A | * | 5/1996 | Hiraga et al. | 395/333 |
| 5,548,506 A | * | 8/1996 | Srinivasan | 364/401 |
| 5,548,722 A | * | 8/1996 | Jalalian et al. | 395/200.1 |
| 5,745,711 A | * | 4/1998 | Kitahara et al. | 345/330 |
| 5,761,419 A | * | 6/1998 | Schwartz et al. | 395/200.34 |
| 5,796,396 A | * | 8/1998 | Rich | 345/332 |

* cited by examiner

GROUP BASED COMPUTER USE SYSTEM

FIELD OF THE INVENTION

The present invention relates to computer systems and, in particular, to a new product type which has been termed "Groupware" and relates to software and hardware tools which facilitate group activities. In particular, the present invention discloses a facilitation system permitting interaction between a number of persons.

BACKGROUND ART

Groupware is a combination of hardware and software tools which permit interaction between persons generally in a meeting, network, education or conference environment. A working definition of "groupware" was provided by an article in a Supplement to PC Week Oct. 14, 1991 Vol. 8 No. 41, which stated, inter alia, that "'groupware' refers to more than just a set of electronic tools. Groupware as a concept is being expanded to include the work processes and designs that the tools, both electronic and non-electronic, support. The interactive or interpersonal dimension of groupware is its key element. In general, groupware products are simply tools that support collaborative work and sharing of information in the pursuit of work-group goals and objectives. As a software category, groupware supports the activities of existing work groups or teams. The current interest in groupware is being driven by the pursuit of enhanced work-group effectiveness. (Generally), improving personal productivity does not necessarily lead to improvements in either group or enterprise productivity and effectiveness. (This has led to a search) for a means by which group processes can be improved and enhanced, often by re-engineering those processes."

Examples of such systems are those sold under the following trade names "NOTES" developed by Lotus Development, "TeamFocus" developed by IBM Corporation, "VisionQuest" developed by Collaborative Technologies of Austin, Tex., and "GroupSystems" developed by Ventana. These systems are generally configured so that a number of stand alone personal computers (PC's) are linked via a network and users of each PC can interact with each other over the network by means of the controlling software and the individual screen displays provided thereby. Such a configuration permits every member to a meeting having access to a PC, (normally each member has his own PC) the opportunity to provide input at an equal level with every other member of the meeting, and have the information displayed in a common format on the various screens associated with the PC's. A further extension of these systems, as with Lotus "NOTES", is to facilitate the use of electronic mail (EMAIL) whereby persons at different locations can be linked in an interactive manner.

However, these known systems are not without their drawbacks. In particular, the cost of establishing a meeting room provided with a number of PC's, generally about eight to twelve, can be restrictive and at current prices can cost between US$20,000 to US$40,000 for these hardware items. In addition, licenses for the abovementioned software products can be in excess of US$25,000. In some cases, owners of such meeting rooms can rent them at a cost of between $2,000 and $7,000 per day to parties wishing to use these facilities. A further disadvantage is that each PC user essentially concentrates upon their own PC and accordingly their own ideas, whilst not necessarily interacting with the group which is the real purpose of a meeting. This applies particularly for some types of meeting such as "brainstorming", decision making, planning, and so on.

SUMMARY OF THE INVENTION

It is an object of the present invention to substantially overcome, or ameliorate, the abovementioned difficulties through provision of an alternative groupware product of generally reduced cost and which permits substantial levels of group interaction.

In accordance with one aspect of the present invention there is disclosed a facilitation system to facilitate communication amongst a number of persons, each having access to a keyboard or similar data input device, said system comprising a control computer, a control program stored in said control computer and operable to permit data entered on each and any of said input devices to be transferred to said control computer, and at least one display means having its display surface divided into a plurality of display areas, each input device having a corresponding display area and there being at least one further display area, the data input via each input device being displayed on the corresponding display area, and at least one control device connected to said control computer and operable to select specific data displayed on any of said display areas and both transfer and display said specific data on any other of said display areas.

The control device can be a keyboard of the control computer, and/or a mouse or other corresponding device connected to the control computer. Preferably, the keyboards or similar data input devices operated by the persons are connected to a facilitator unit which acts to buffer signals sourced from the input devices to the control computer.

BRIEF DESCRIPTION OF THE DRAWINGS

A preferred embodiment of the present invention will now be described with reference to the drawings, in which.

BEST AND OTHER MODES FOR CARRYING OUT THE INVENTION

Figure 1:
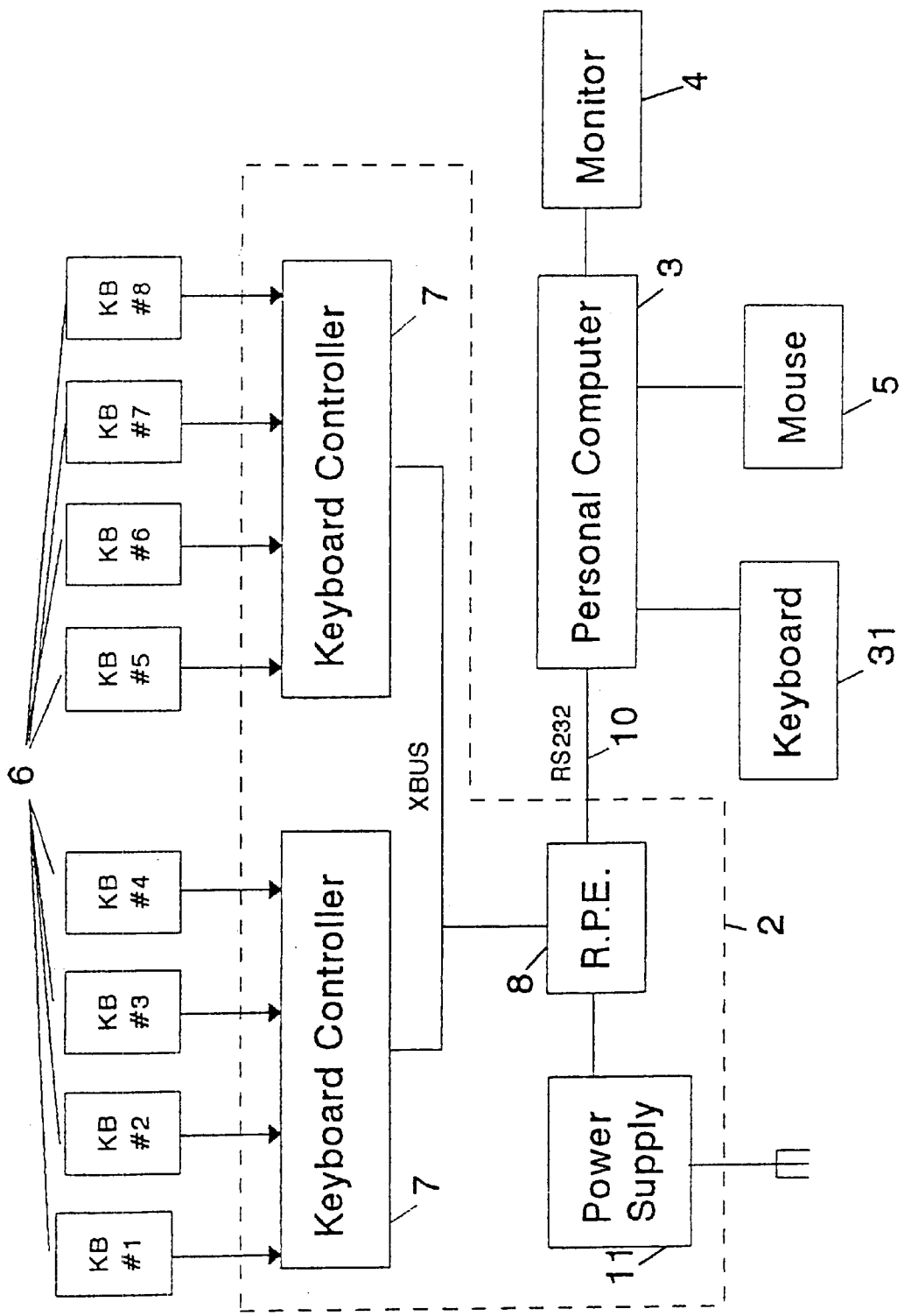
FIG. 1 is a schematic block diagram representation of a facilitation system of the preferred embodiment.

Turning now to FIG. 1, a facilitation system 1 is shown which includes a facilitator unit 2, that connects to a personal computer 3 having an associated monitor 4, a mouse 5, and a keyboard 31.

The facilitator unit 2 permits the interconnection of eight keyboards 6 (KB#1 . . . KB#8) to the personal computer 3 to enable users of each of the keyboards 6 to simultaneously input data for simultaneous display on the monitor 4.

The facilitator unit 2 comprises two keyboard controllers 7 each adapted to interface four of the keyboards 6 to an XBUS 9 which interfaces to a remote processor element (RPE) board 8. The RPE board 8 and the keyboard controller 7 are powered via a power supply 11. The RPE board 8 permits interconnection between the keyboard controllers 7 and the personal computer 3 by means of a serial data link 10 which is configured in RS232 format. The keyboards 6 can be any type of computer keyboard but in the preferred embodiment are standard IBM-AT mode PC keyboards which provide an output via a standard 9 pin RS422 serial interface operating at 9600 baud. The data rate can be reconfigured by alteration with the RPE board 8.

The RPE board 8 is a standard 68000 based processor board and includes serial I/O connection 10 and expansion bus XBUS 9 and 128 K of RAM And 256 K of ROM. The RPE board 8 is not shown illustrated in detail as it is of standard configuration and has its ROM pre-programmed to cause appropriate operation of the facilitator unit in a desired manner. This will be described later.

Figure 2:
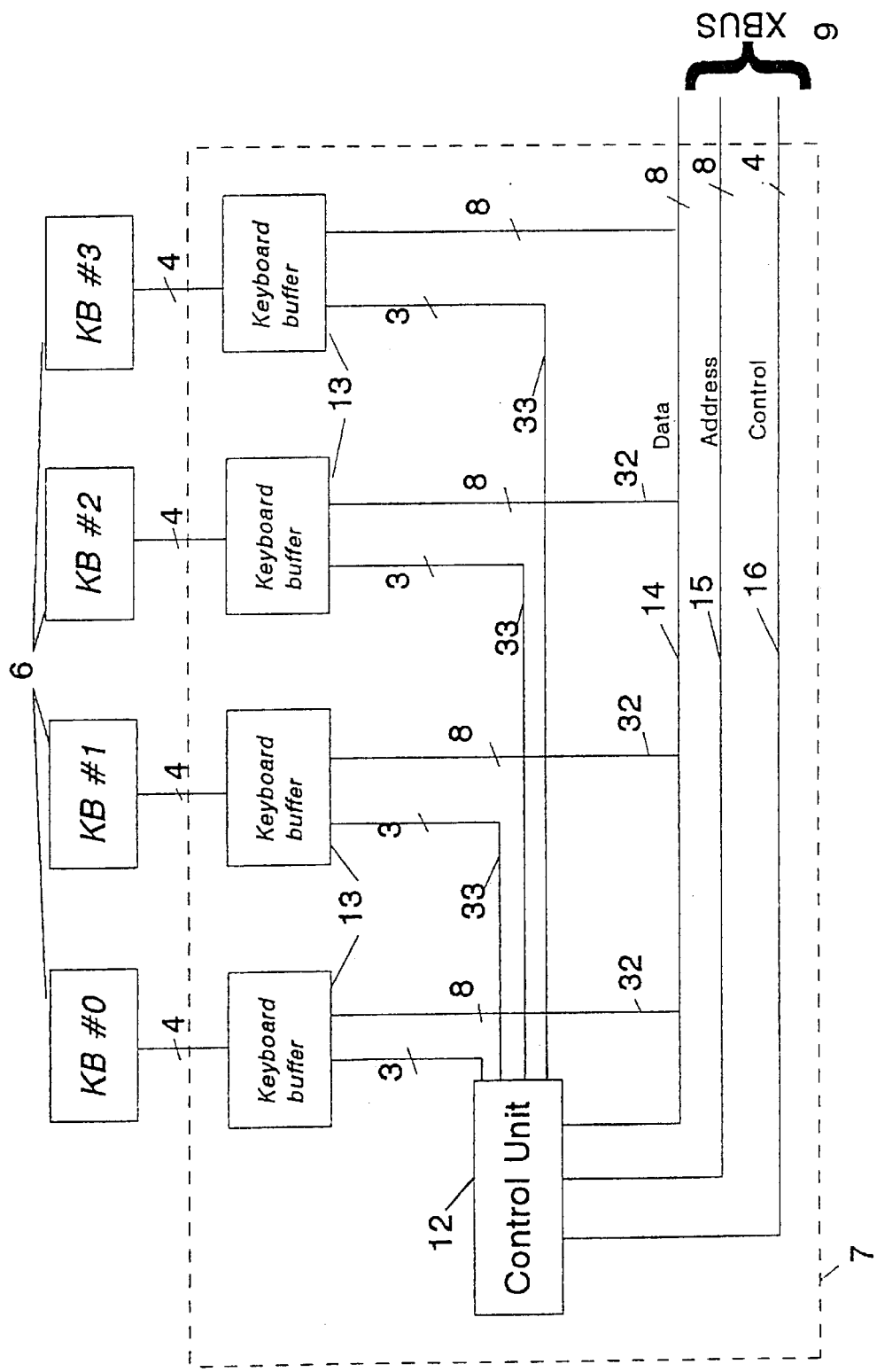
FIG. 2 is a block diagram representation of one of the keyboard controllers of FIG. 1.

Turning now to FIG. 2, the configuration of the keyboard controllers 7 is shown. The controllers 7 are configured to convert serial data from four of the keyboards 6 and to reconfigure that data as parallel data on the XBUS 9. Each keyboard controller 7 includes a control unit 12, into which is input the XBUS 9 having 8-bit data bus 14, and 8-bit address bus 15, and a 4-bit control bus 16. The control unit 12 also interconnects with four keyboard buffers 13 which interface with four of the keyboards 6 (here designated as KB0, KB1, KB2 and KB3). Each of the keyboard buffers 13 includes an 8-bit data output 32 which connects directly to the data bus 14. Also, the control unit 12 interconnects with each of the keyboard buffers 13 via four sets of three control lines 33.

Figure 3:
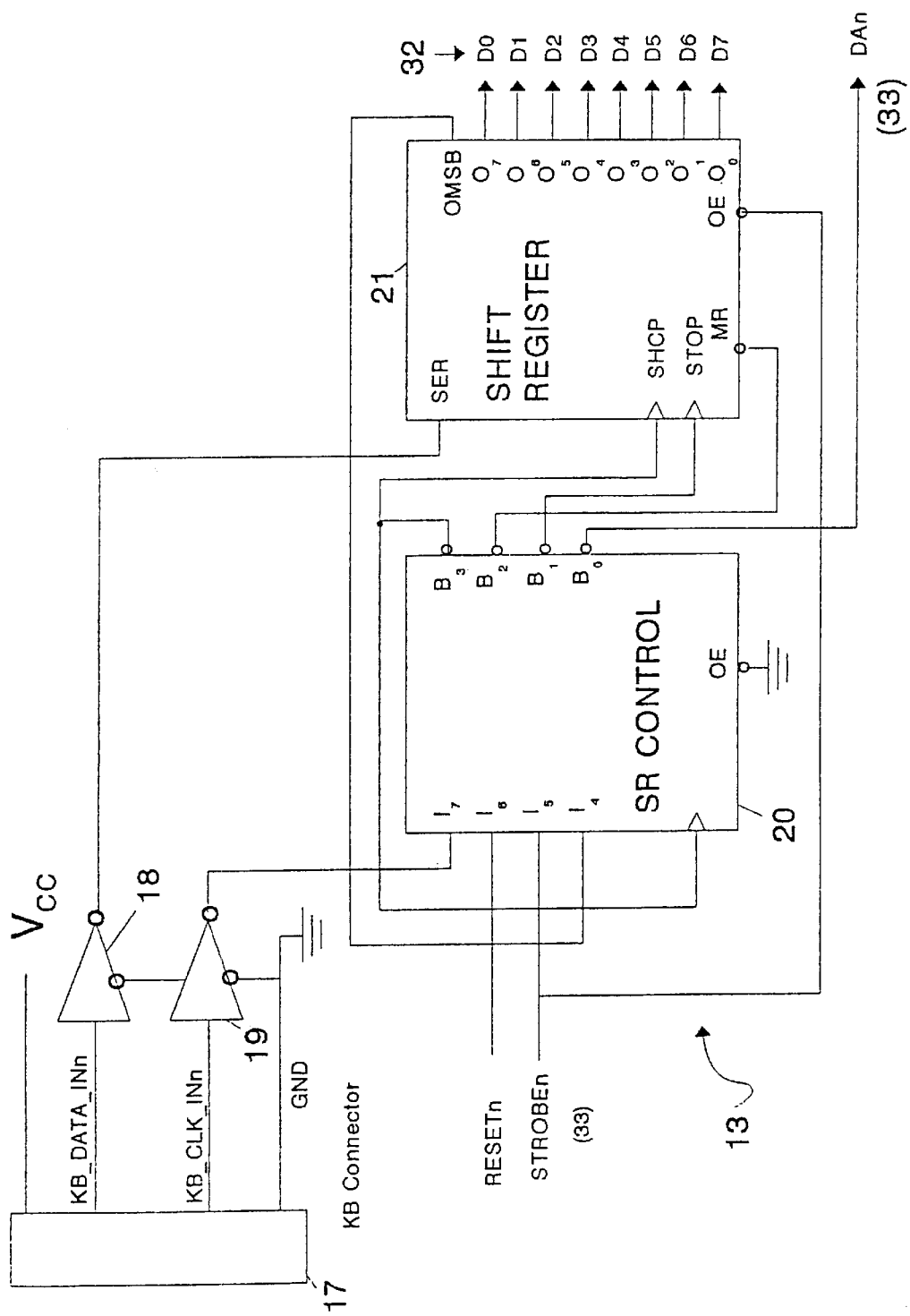
FIG. 3 is a schematic circuit diagram of one of the keyboard buffers of FIG. 2.

Turning now to FIG. 3, the configuration of the keyboard buffers 13 is shown. The corresponding keyboards connects to a 9-pin keyboard connector 14, of which only four pins are used. One pin provides a supply voltage Vcc to the keyboard and another supplies a ground connecting GND. The keyboard output serial data via a data line KB_DATA INn which is input an inverter 18. The keyboard also outputs a clock signal KB_CLK_INn which is input to an inverter 19. The data signal output from the inverter 18 is supplied to the serial input SER of a shift register 21. The shift register 21 converts serial data from the keyboard to parallel data that is output on the data lines 32. The shift register 21 has tri-state outputs which permits any one of the four shift registers 21 in each keyboard controller 7 to be separately asserted.

A shift register controller 20 is also provided which is preferably implemented using a programmable logic array. The shift register controller 20 is input with a RESETn signal and a STROBEn signal from the control unit 12 relating to that particular keyboard buffer 13. Those signals, together with the clock signal from the inverter 19 and the overflow bit from the shift register 21 provide inputs for the shift register controller 20. The shift register controller 20 operates to clock the shift register 21 via it's SHOP and STOP inputs, to reset the shift register 21 via a master reset MR input. The STROBEn signal also directly enables the outputs of the shift register 21. The shift register controller 20 also includes a data available output DAn which is asserted when a keystroke is made on the keyboard. The logic functions of the shift register controller 20 are standard and can be derived by those skilled in the art.

Figure 4:
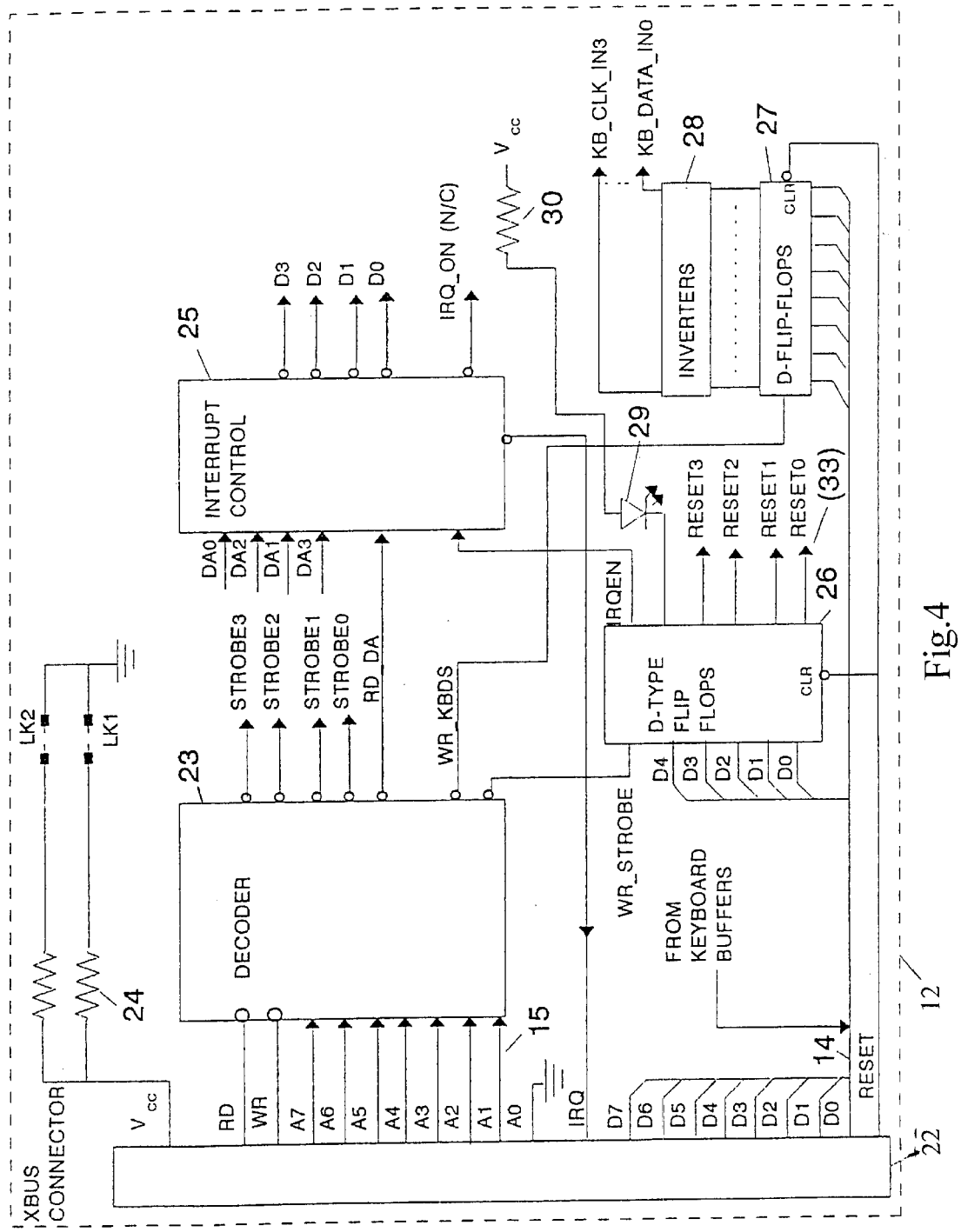
FIG. 4 is a schematic circuit diagram of the control unit of FIG. 2.

The control unit 12 as seen in FIG. 4, includes a connector 22 which permits connection to the XBUS 9 and which receives data, address and control signals from the RPE board 8. The address bus 15 and the read and write lines (RD,WR) of the control bus 16 connects directly to a decoder 23 to thereby permit strobing of each of the keyboards 6 connected to the keyboard controller 7. The decoder 23 is also input with logic values provided by two link connectors (LK1,LK2) which distinguish between the two keyboard connectors 7 arranged within a single facilitator unit 2. Accordingly, each of the eight keyboards 6 shown in FIG. 1 can be individually identified in this manner.

The decoder 23 is preferably implemented by a programmable logic array which can be configured in a desired manner.

The STROBEn outputs of the decoder 23 connect directly to the respective keyboard buffer 13 whilst the remaining three signals (RD DA, WR_KBSD,WR_STROBE) are used for internal control. The RD_DA signal inputs to an interrupt controller 25 which is input with the data available signals (DAn) from each of the keyboard buffers 13. These signals indicate that valid data is being output from the respective keyboard buffer 13 and the interrupt controller 25 outputs to the four least significant bits (D0 . . . D3) of the data bus 14 as well as providing the interrupt output IRQ on the control bus 16. This indicates to the RPE board 8 which of the keyboards 6 has valid data. The RPE board 8 is able to process the interrupt request and by strobing the address bus, can identify the particular keyboard buffer 13 which has valid data, and to enable the data bus 14 for the receipt of that valid data. The interrupt controller 25 is also preferably implemented using a programmable logic array.

Connected to the five least significant bits of the data bus 14, is an array of six D-type flip-flops 26 which provide reset signals RESETn for each of the keyboard buffers 13 as well as an interrupt enable signal IRQEN to the interrupt controller 25. The flip-flops 26 also output to a LED 29 which illuminates upon the assertion of an interrupt being enabled.

Optionally, the control unit 12 can be configured to transmit logic to each of the keyboards 6 where the keyboards are specifically adapted to receive data. To achieve this function, an array of eight D-type flip-flops 27 and a complementary number of inverters 28 are configured to connect to the data bus 14 and to output KB_DATA_INn and KB_CLK_INn signals to each of the keyboards.

In operation, when one of the keyboard controllers 7 receives a character from one of the connected keyboards 6, when the bus 9 is free, the character is applied to the bus 9 along with the address of the keyboard 6 from which the character cam. The RPE board 8 receives the data from the bus 9, extracts a key-code from the keyboard message, and adds an address followed by a synchronising byte to the front of the key-code and then forwards this data stream along the communications line 10 to the personal computer 3. The personal computer 3 is configured to display the data on the monitor 4.

Figure 5:
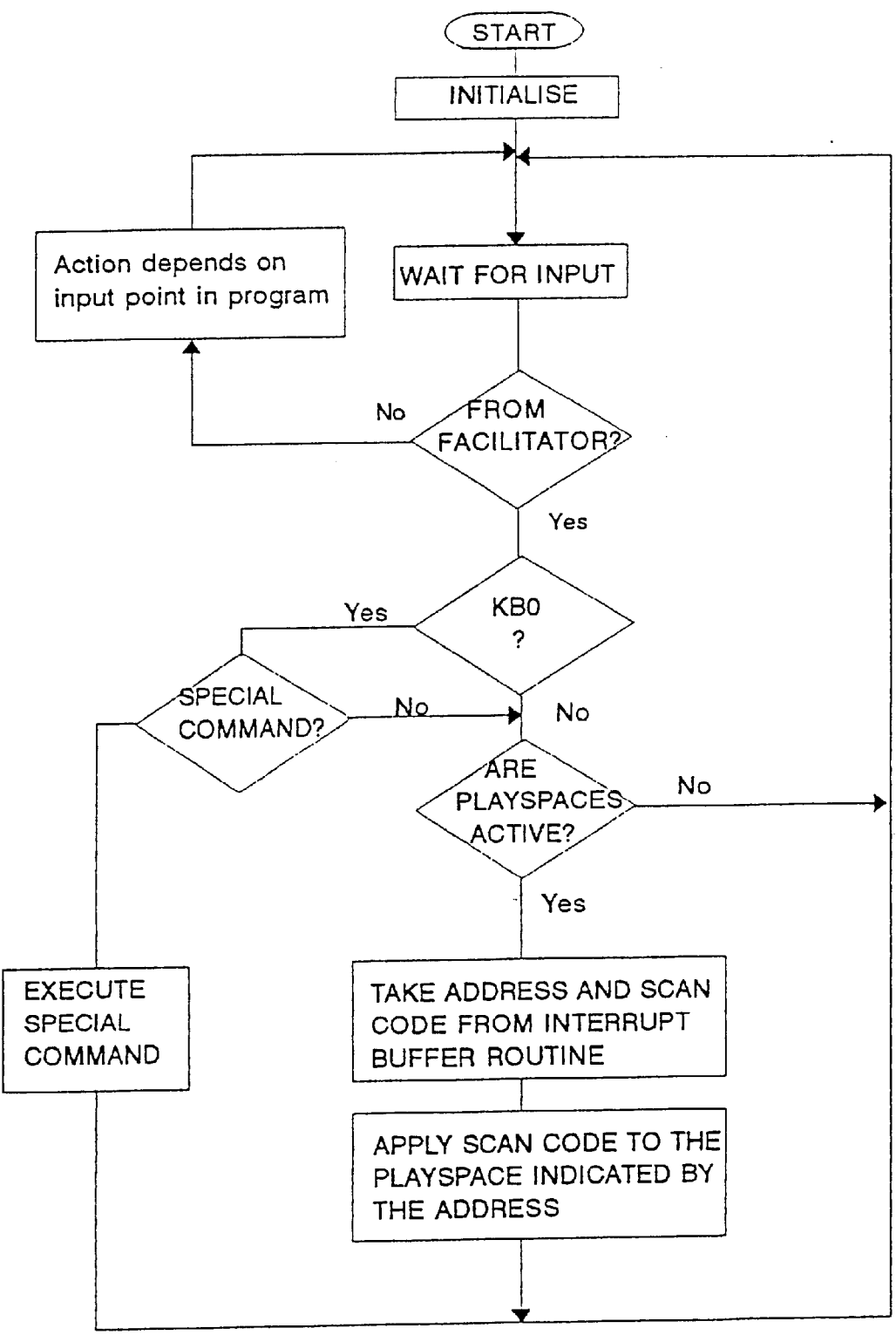
FIG. 5 is a flow chart describing the software used to control the facilitation system.
Figure 6:
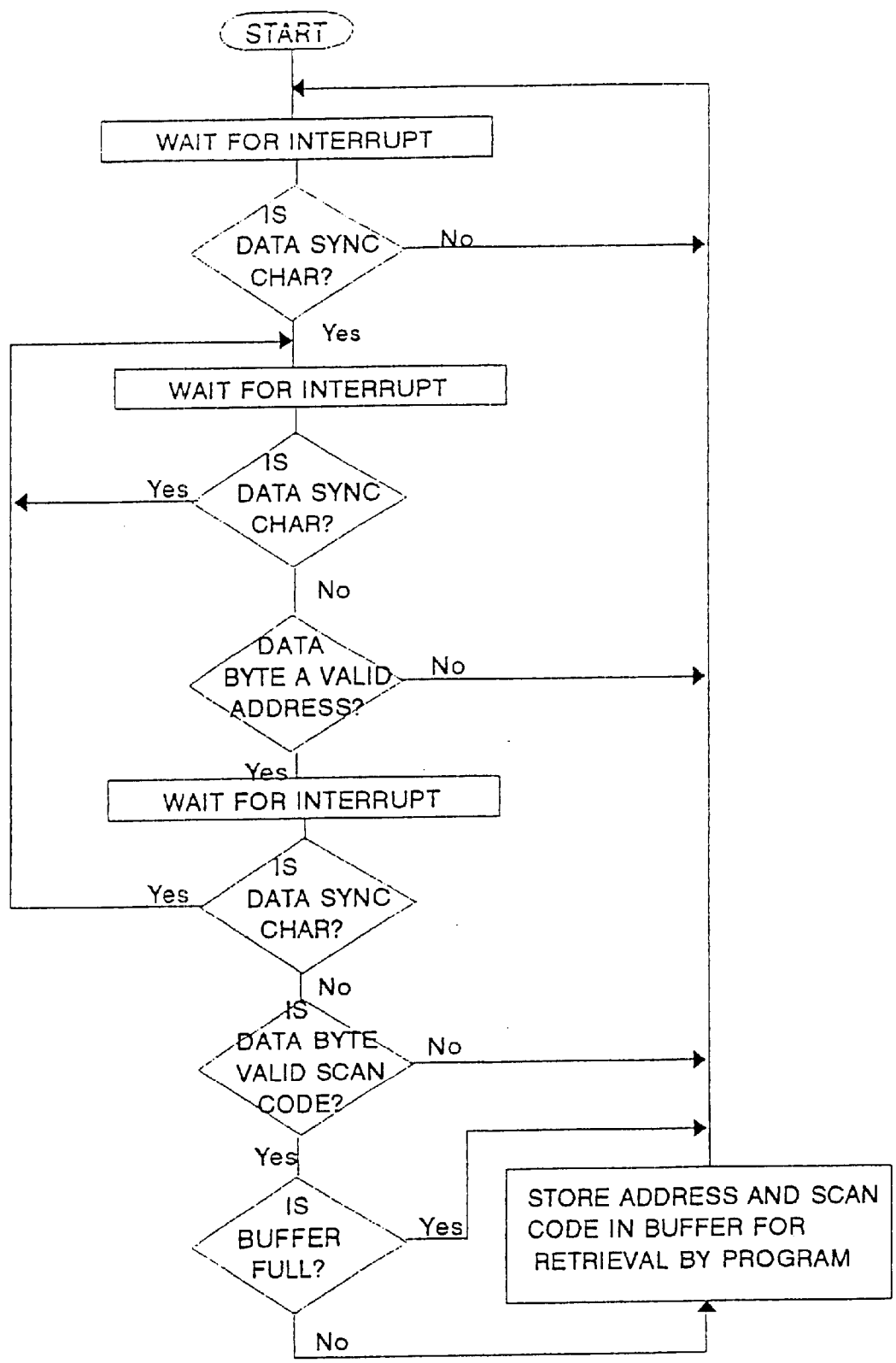
FIG. 6 is a flow chart which shows the interrupt service routine.

The personal computer 3 receives the data message via a hardware initiated interrupt service routine, which is shown in FIG. 6. The routine of FIG. 6 is initiated each time a character is received from the facilitator unit 2 and checks for a valid message. In order to obtain a valid message, the personal computer 3 must receive a sync byte, a valid address byte and then a key-code byte. If the message is valid, the address and key-code are stored in a circular buffer maintained in the RAM of the personal computer 3 for retrieval by the main program (described with reference to FIG. 5). Otherwise, an invalid message is ignored. In addition, any data received while the buffer is full is ignored.

The personal computer 3 is programmed to permit operation of the facilitator unit 2 and the keyboard 6 such that information entered onto any one of the keyboards 6 is displayed in a corresponding portion of the image of the monitor 4. These portions are terms "playspaces".

In FIG. 5, after an initialisation procedure, the main program waits for an input and then determines whether or not the input is from the facilitator unit 2. If not, input has been provided either via the mouse 5, or the keyboard 31 of the personal computer 3 or an external source. These devices provide controlling functions for the operation of the system 1 which are described later. If the data input is from the facilitator unit 2, it is determined whether or not it is an input from the keyboard 6, or a control input from the RPE board 8. If from the keyboards, the data is examined as to whether or not it identifies a special command and if so, the special command is executed. This can be a printing command (to be described later), for example. If not, and if the information is not from the keyboard 6, the main program identifies whether or not the playspaces are active. If not, the program returns to its idle state. If so, the address and scan code are obtained and are applied to the corresponding playspace so as to display the particular data received.

From the foregoing it is apparent that a plurality of users can each simultaneously input data via a computer keyboard for display on a common monitor through a single personal computer. In this manner, all users are able to see all information at the same time.

Although the foregoing describes the implementation of the system 1, its uses are wide and varied for a range of Groupware applications. Accordingly, the foregoing hardware and program control is generally operated in concert with an application program.

So that the preferred embodiment can be used in a variety of applications, such as for meetings or for training, it is desirable that a person be designated as the leader or convenor of the appropriate environment. For this, one of the keyboards (KB#1) is provided with overall functional control of the system 1, whereas the other keyboards (KB#2 ... KB#8) have text input and editing features only for their respective playspaces. In this manner, the convenor using KB#1 can also make use of the keyboard 31 and/or mouse 5 to control the operation of the main program to achieve various results equivalent to a chairman of a conventional meeting using highly developed chairmanship skills.

In addition, special function keys of KB#1 are enabled to have the functions listed in Table 1 at the end of this specification.

The text editing commands available to all keyboards are listed in Table 2 at the end of this specification.

The mouse 5 is configured to permit all operations designated from the left button of the mouse.

The personal computer 3 can also be connected to a network or data base from which the convenor can retrieve data for display within the team space 36 or transmit data from the team space 36 to another location.

Any number of applications packages can be developed to perform various facilitation functions. Some of those applications can include syndicate work, problem solving, environmental scanning, conflict resolution, strategic planning, organisational changes, autonomous work groups, new business creation, total quality management, workshops, training, brainstorming, team building, corporate planning, job and work design, and joint venture formation.

An example of one application is a business planning tool entitled "Creating Our Future". This tool involves a number of stages which are described below:

Team Building: Team members log on, and discuss and record their interests, education, work, hobbies, sports politics.

Team Setting: The team selects the Task for the facilitation session from one of several formats, or writes their own. The task can be recalled to a window at any time to keep the group focused.

Stakeholder Plain: All stakeholders (people or organisations with an interest in the problem), and their attitudes to it are identified. At the end of the session, this screen provides the data that is later used to develop a Stakeholder Action Plan.

Brainstorming: Team members write their ideas for the Ideal Future (or ideal ways to solve a problem) in their own window. On pressing the Return key, the ideas are added to the Teamspace. Ideas are collected under separate windows for Economic, Political, Social, Environmental and Technical categories.

Strategic Vision: Using the mouse, the convenor can select and collect all the best ideas from the brainstorming work to write a team strategic vision.

SWOR (Strengths, Weaknesses, Opportunities, Threads) Test: Team members critique the vision, and develop ideas about how to improve it, and begin making it happen. Ideas are listed under Strengths, Weaknesses, Opportunities and Threats.

Strategies and Action Plans: The application presents the Strengths, Weaknesses, Opportunities and Threats, one at a time for the team to develop strategies to deal with it, and then actions plans (What? Who? How? By When?)

Stakeholder Action Plans The team returns to the Stakeholder list, records or hypothesises stakeholders intersects and develops an Action Plan to deal with them.

Team Critique Team performance is reviewed at the end of each session and improvement strategies agreed. The application presents a number of standard criteria for assessing team performance (Listening, Adding Value to Ideas, Giving Ideas Away. Caring about what we are doing, etc.) These criteria are established/selected in the Team Setting section. Other Criteria can be added.

Figure 7:
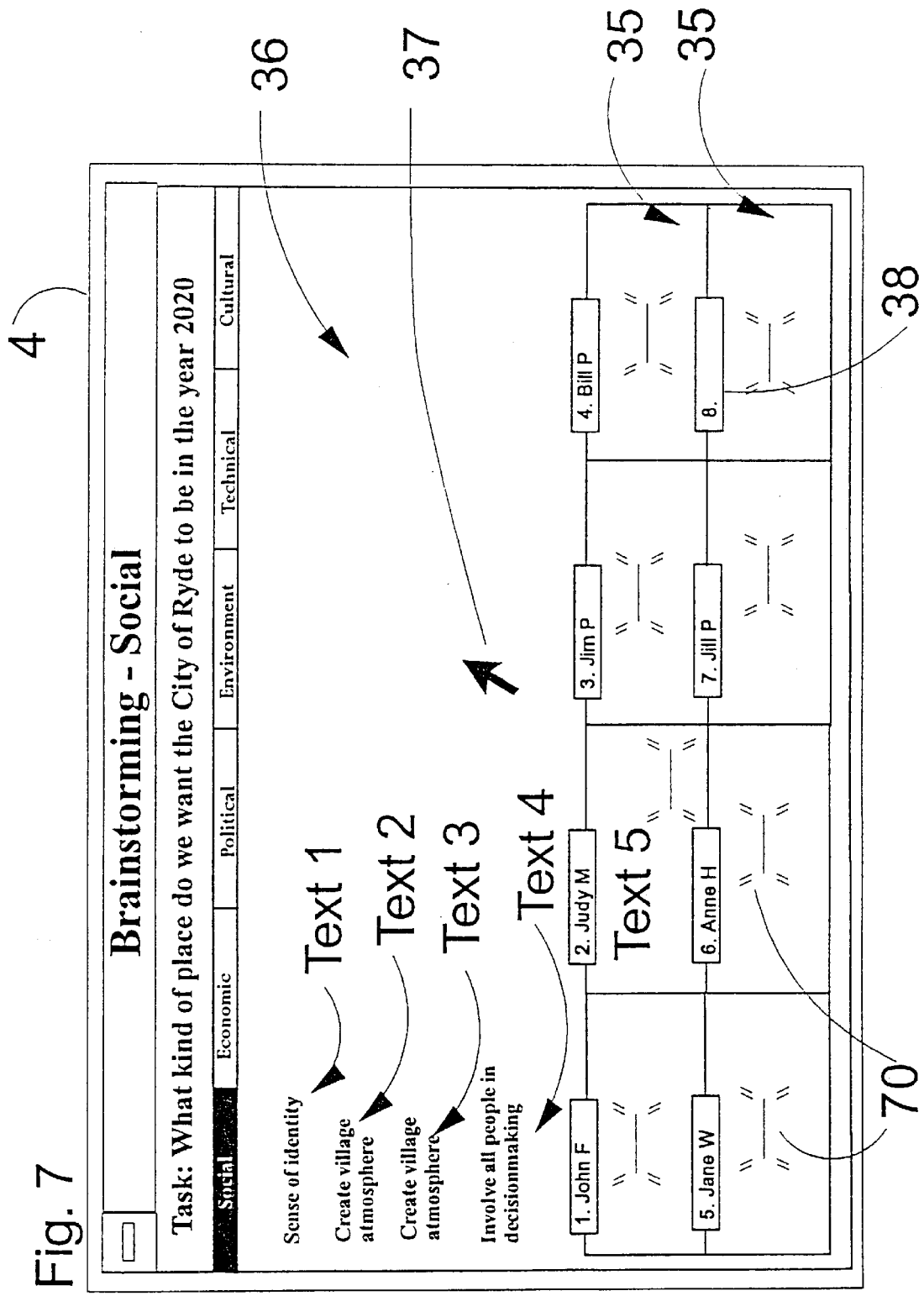
FIG. 7 is an example of the display provided to the users of the system.

Turning now to FIG. 7, a typical display is shown of the system in use. In this particular example the brainstorming screen has been selected as displayed along the top of the monitor 4. The "Social" ideas option has been selected (as displayed on the Top Line of the screen, and the social aspects of the Task (as displayed in the second line of the screen) are being collected from participants.

Arranged at the bottom of the screen are eight playspaces 35 which are available for use by the respective operator of the keyboards KB#1 ..., KB#8. Each of the playspaces 35 has the name of the user indicated in a namespace 38, at the top of the playspace 35 and any text that the user may have typed but not yet consigned into the teamspace 36 (by typing Enter). Each playspace 35 also has a corresponding cursor 70 which operates in the usual manner for the appropriate participant.

Text typed by users (indicated by Text 1, Text 2, Text 3 and Text 4) has previously been entered in the Teamspace 36 by users and Text 5 is ready to be entered by Keyboard #2 (Judy M). The Convenor, in this example name John F (Keyboard #1) has access to the mouse 5 and therefore control over and arrow icon 37 and therefore control over the selection of the subject categories from the Categories presented (Social etc.) and ability to exit the screen by clicking the mouse in the top Lh corner of the screen, or striking Esc).

All data entered by each of the users is periodically stored automatically with every 500 key strokes and can be printed out during or after a session.

Figure 8:
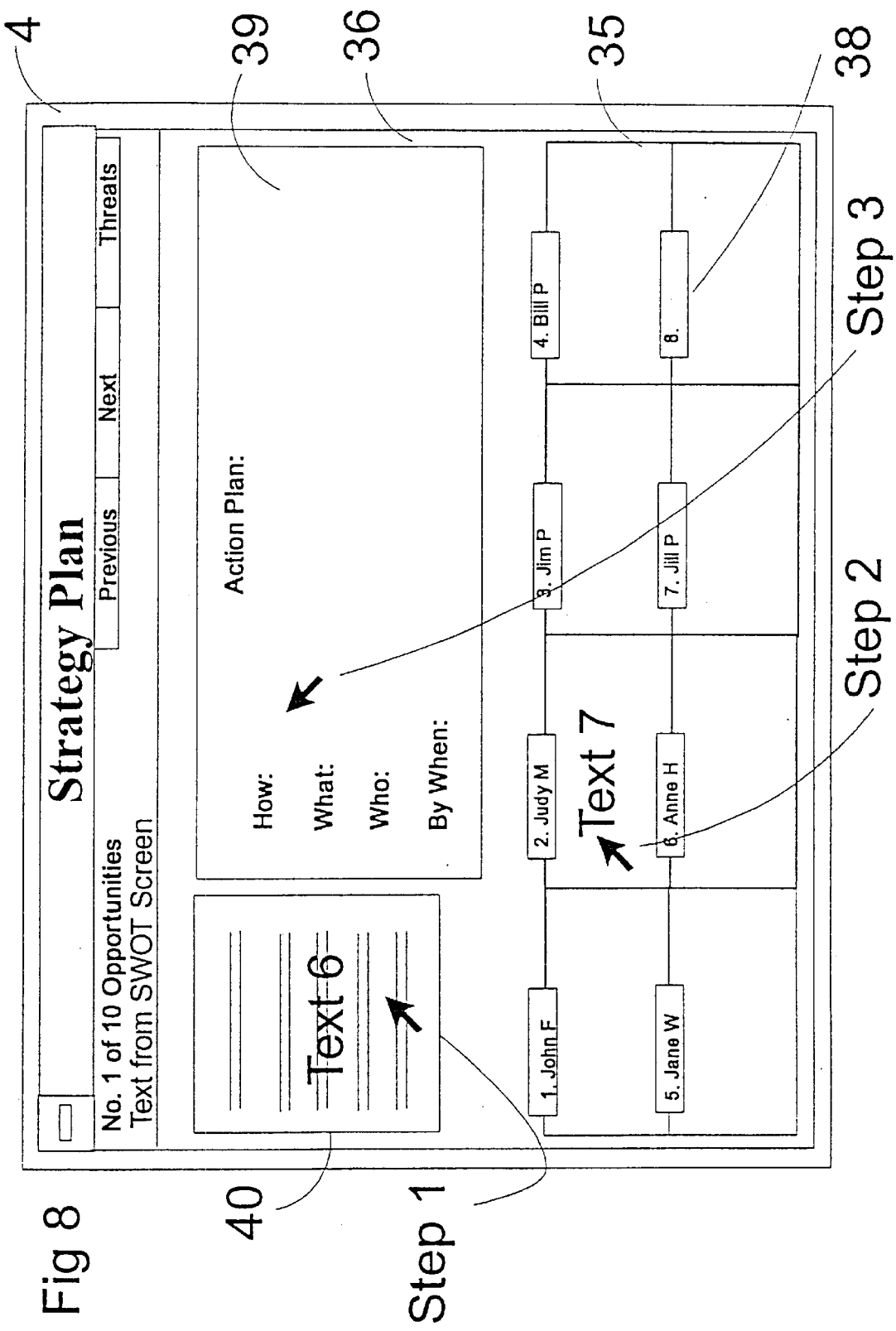
FIG. 8 is an example of a "Brainstorming" display.

In other screen, typically the Strategy Plan Screen, see FIG. 8, the facilitator, Keyboard #1, is able to open a window 39 on the screen relating to one of the text entries, (Text 6), and has control over the mouse icon 37 enabling the selection of data Text 7 from other users Playspaces 35 and to deposit this text in this window 39.

In particular, in step 1, the mouse 5 is clicked on to open the action plan window 39. In step 2, Text 7 is clicked on with the mouse 5, whilst in step 3, Text 7 is moved to the "WHAT" location by again clocking the mouse 5.

Generally, the various menus and displays of the application program are arranged in a certain thinking process order thus enabling inputs from an earlier screen to be carried through later screens for editing, amplification and sorting, etc.

Also the amplification be programmed with a team profile thereby permitting accurate role determination for the setting of various tasks for respective members of the team. This is performed during the Team Setting stage.

The print functions also are adapted to group functions in a logical format. This enables printing of:

(i) the present Team and Team member profiles;

(ii) the Strategy Plan with the corresponding Action Plan;

(iii) the Stakeholder Plan with the corresponding Interests Plan; and (iv) the Team Critique with the Improvement Strategy.

It will be apparent to those skilled in the art that a number of operational advantages are achieved because of the interaction of the hardware, the software, and human psychology. In particular, no matter how timed a particular user is, they can type in a comment or suggestion without being intimidated. In a conventional meeting, it would be necessary for the chairman of the meeting to "read" the facial expressions (and possibly other body language) of the timed person and invite, or coax, them to comment.

Similarly, but conversely, a loud speaking dominant personality type is unable to dominate proceedings so as often happens in conventional meetings.

These advantages are less easily achieved with the prior art groupware devices since all the participants are not observing a single screen (monitor 4).

Furthermore, each participant can be provided with a record of the contributions from all participants. This record keeping facility enables the level and quality of each participant's contribution to be readily assessed.

In a meeting called to design a new form or preformatted document, for example, various components of the form can be entered into individual playspaces 35, and the convenor can form a "current draft" form for display to all users on the team space 36. Then any user can enter a proposed amendment into this playspace 35, this can be discussed by all present, and inserted into the "current draft" on the team space 36 by the convenor after agreement is reached. This procedure can be repeated, various steps reversed, and so on until a final draft is achieved. This amalgam of democracy and benign dictatorship allows a democratic result with wide input to be achieved decisively. Such a result is not as readily achievable, if at all, with the prior art groupware systems.

The facilitation system 1 enables the organisation's electronic linkages, to include terms of people (in the workplace, this might include everything from the senior management team, to self-directed work groups at the lowest level) or interface linkages e.g. external-internal groups comprised of members of the organisation and its stakeholders, e.g., for relationships marketing, joint venture formation, strategic alliances, just-in-time supplier-customer relationships, developer-environmental group relationships.

For games, the facilitator system enables each of the participants to control the movement of a pixel or group of pixels on the screen in relation to each other using a keyboard, joystick, writing tablet or other device. The Screen replaces the traditional board i.e. scrabble, monopoly, or permits more than one participant to interact e.g. aerial dogfight, multi-people dungeons and dragons with the characters under the control of separate participants.

For graphics each of the participants (using their own keyboard, joystick or writing tablet) is able to separately control a function of the graphics creation or manipulation on the screen e.g. create a model for interactive components of a system and have each of the eight keyboards and their operates simulate a series of interactive events.

For a group spreadsheets, this represents an extension of several of the screens. It enables members of the group to contribute information to a single spreadsheet or interrelated spreadsheets spreadsheet e.g. a seven dimensions spreadsheet link-up.

For group learning, the screens can be adapted to enable each of the eight participants to answer questions as an individual or group, co-operatively or competitively, from learning material presented to the Group by the help screens or imported via switching to a Learning Program prepared on another software program e.g. Icon Author, Microsoft Author.

In order to use the system as a learning centre, questions are previously listed one at a time on the stakeholder screen, and presented one at a time to the group in the Stakeholder Plan Screen. The Group members contribute their answers to each question.

For case management, the system 1 allows eight people in, for example, a medical team (doctor, physiotherapist, nurse etc.) to list their current views about a patient's health and to then make a group decision about the subsequent treatment.

The facilitation system 1 represents a systemic integration of hardware, software and multi-faceted human feeling and thinking activities. It is more than a meeting and brainstorming centre. Furthermore, the system 1 switches the emphasis from traditional computing related activities which process human thinking serially, to systemic processes, which process human thinking in an integrated way.

In a conventional meeting and in computerised meetings described earlier the process of developing ideas about a particular subject and the function of recording the data takes place separately.

With the system 1, both process and function are integrated and each participant has equal opportunity to contribute what they feel or think, including new ideas sparked by their interaction with others in the group.

In addition, and unlike other systems described earlier, the system 1 is portable, and can be re-located from one work area to another with little effort (by moving a few keyboards, the facilitator unit, and a floppy disc incorporating the control and application program). This means that whenever a PC is operating, a system can be linked to it without the logistics of the permanent meeting centre.

Figure 9:
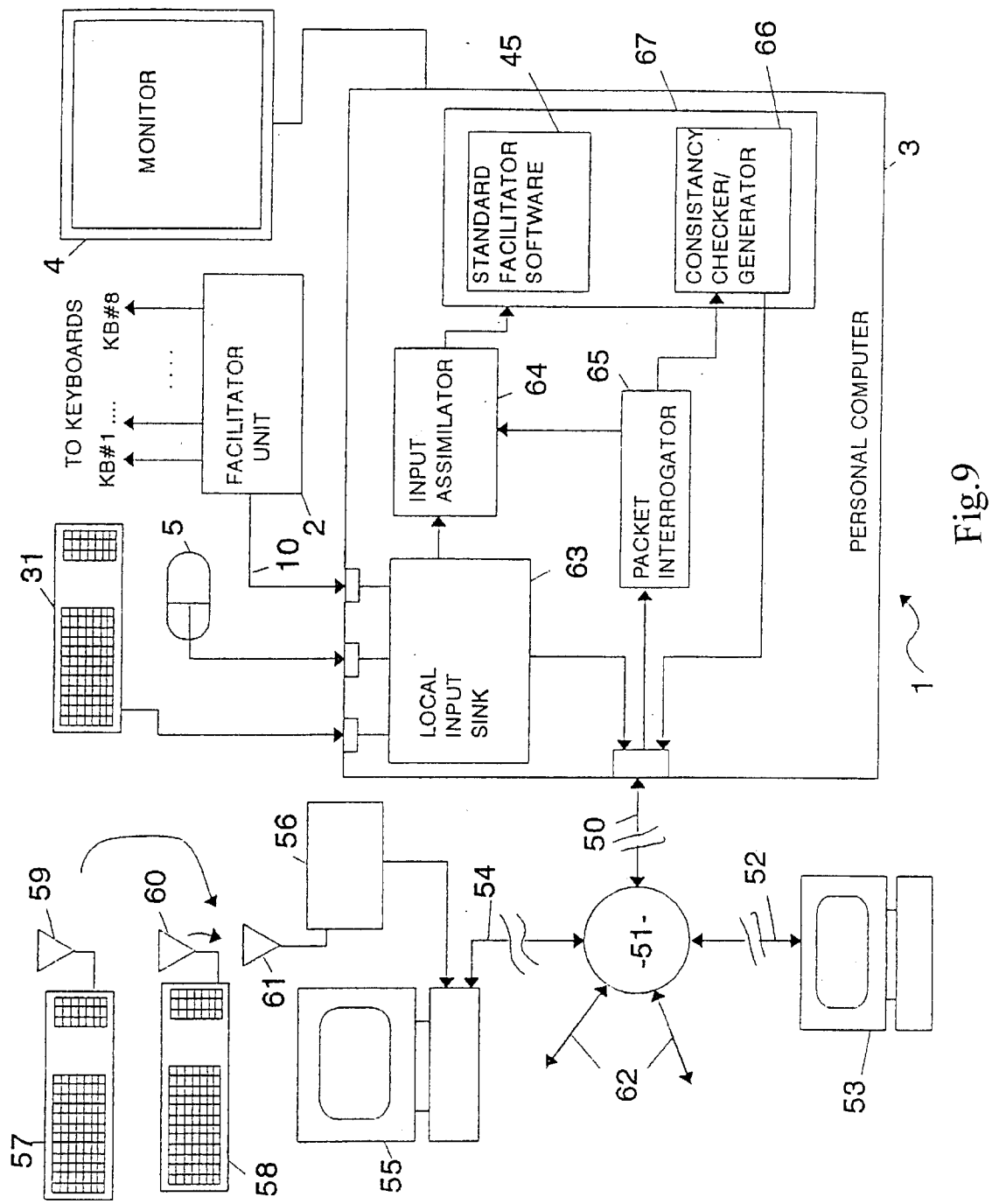
FIG. 9 is a block diagram representation of the embodiment of FIGS. 1 to 8 configured for network operation.

The system 1 is applicable to operation where all the system users are in a single location, a meeting room for example. FIG. 9 shows an arrangement by which the facilitation system 1 can be operated over a distributed network, with users and participants thereby being located in other rooms, buildings or cities.

FIG. 9 shows a schematic block diagram of the facilitation system 1 in a network configuration.

As shown, the personal computer (PC) 3 interconnects to a facilitation unit 2, monitor 4, mouse 5, and control keyboard 31 in the previous manner. The personal computer 3 here also connects to a network 51 via a connection 50 such as a modem connected telephone line. The network 51 permits communication between the personal computer 3 and other devices, in this case computers 53 and 55 which interconnect via lines 52 and 54 respectively.

The computer 53 can be operated by a single person whereas the computer 53 interconnects to a facilitator unit 56 which permits users of two keyboards 57 and 58 to link into the system 1. In this embodiment, the facilitator unit 56 has a radio frequency link with the keyboards 57 and 58 via antennas 61, 50 and 60, respectively. Alternatively, an optical sink for example using infra-red light can be used.

The aim of a networked system 1 is to allow the participant keyboards to be in remote locations, and to also supply these remote participants with the same output screen display 6 as at all other locations.

The limit of the total number of participating keyboards in this embodiment is 8, with 0 to 8 keyboards active at any one location. As before there must be at least one participating keyboard, which is designated keyboard #1. There must also be one participating mouse 5, connection to the same PC 3 as that keyboard #1, the PC 3 being known as the Host PC. In an exemplary embodiment, the control keyboard 31 can be designated as keyboard #1. This is particularly useful in networked facilitation sessions where the host PC links only one participant into the network and hence the facilitator unit can be discarded at that location.

This configuration allows the number of participating locations to range from 1 to many, the upper limit being determined by internal software limits (at least 9 to allow 2 participating keyboard at 8 sites and one purely observational site) and network performance/capability.

In order to implement the networked system 1, it is necessary to configure the host PC 3 to collate input data from each location, and to supply a common display output to each location. This is best achieved by configuring the host PC 3 with a number of software modules (63,64,65,66) that are provided in addition to a module representing the standard facilitation software 45 corresponding to that described above with reference to FIGS. 5 and 6.

Any keyboard at any location can be configured to operate as any one of the keyboards #1 to #8, however, there should be no conflicts between designated keyboard numbers between locations. This is handled by the consistency generator/checker (CGC) 66 which, together with the standard software 45, forms a main working code 67 for the system 1. The CGC 66 removes the necessity to have a facilitation unit 5,56 at a location where only one person wishes to participate in the facilitation session as alluded to above.

Similarly those keyboards connected to the facilitation unit 5 can be configured to operate as any keyboard from #2 to #8 at the discretion of the CGC 66 and the facilitator (a person) of the meeting, who is in control of the keyboard #1 and the mouse 5.

A local input sink (LIS) 63 takes its input from up to three local hardware devices, the PC keyboard 31, mouse 5 and facilitator 5. If the PC in question is the Host PC, then input must at least be taken from the PC keyboard 31 and the Mouse 5 as is described above, otherwise all input is optional, allowing a purely observational site to exist. Typically, only the Host PC may take input from its mouse 5 as there is only required one participant mouse per session.

It is also the role of the LIS 63 to transmit its local input information to the other (remote) locations via the network connection 50 as known so that each location receives data of the local input at every other location.

It can be seen from FIG. 9 that these keyboard configurations can be effected by a translation from ultimate keyboard #1 inside the local input sink 53, the necessary translations being determined by the CGC 11 and, as required, by the facilitator at session startup.

The LIS 63 sends its (translated) local user input information to an input assimilator 64 which also takes remote user input from a packet interrogator 65.

The Packet interrogator 65 receives all incoming messages, generally as data packets, from the network connection 50 and determines the nature of these messages. There are two main types of messages, user input messages and data consistency messages. The former of these is passed to the input assimilator 64 in a form identical to the output from the local input sink 63. The latter is sent to the CGC 11 to be examined, acted upon, or replied to as is required.

The input assimilator 64 takes its input from the LIS 63 and the packet interrogator 65 as described above. The output from the input assimilator 64 is sent to the main working code 67, and is not location dependent and thus the main working code 67 at each site and receives identical user information, and is therefore unaware of the ultimate origin of the user input.

It should be remembered that the LIS 63, input assimilator 64 and packet interrogator 65 are software input items and are thus placed outside the main working code 67 in FIG. 9. The consistency checker/generator 66 works with the standard facilitation software 45, and with the other remote consistency checker/generators were used, to maintain a consistent state between the different facilitation sessions at different sites.

Following are pseudo-code routines which depict the operation of the communication components of FIG. 9. The "program running" pseudo-code flags are used to show that these routines are part of the facilitation program as a whole and thus will be "running" so long as the main program is loaded and running.

The "wait" steps at the beginning of each loop do not stop the program execution at this point, but they do (notionally) stop the execution of the pseudo code routine. This would be achieved by the routines either being called in response to a interrupt or being polled by the main working code 67 until some "event" is detected, at which point the pseudo-code routine "continues" to the next statement.

The local input sink 63 is a fairly straightforward routine, also requiring that a translation be carried out so that they any attached keyboard can be used as any keyboard #1 . . . #8. This translation is performed preferably using a 9 element array, element 0 being for the PC keyboard 31, 1–8 for the keyboards connected to the facilitator unit 2. The array is indexed to use the ultimate origin of a keystroke (0, 1–8 as above) and would then return a value (0–7 of (error) indicating the translated keyboard number (0 based).

The pseudo-code representing items 31, 5, 2, 50, 64 and 65 in FIG. 9 can be as follows:

while the program running do
begin
    wait for input from main keyboard (31), mouse (5) or, facilitation unit (2);
    if input from the mouse 5 AND we are Host PC
    then begin
        Transmit input data or other locations via network connection (7)

Pass input data (in appropriate form) to the input assimilator (8);
end
else if input from main keyboard (31) OR facilitation unit (2);
then begin
   Translate ultimate origin to keyboard #;
   Transmit (translated) input data to other locations via network connection (50);
   Pass input data (in appropriate form) to the input assimilator (64);
end
end The pseudo-code for items 50, 64 and 66 of FIG. 9 can be as follows:
while program running do
begin
wait for message (packet) from network connection (50);
if message_type is user input
then
Pass input data (in appropriate form) to input assimilator (44);
   else if message_type is consistency_message
   then
      Act on this message_type;
   else
      Display warning message "Unknown Network message type";
   end Those skilled in the art will appreciate that, using the networked configuration of FIG. 9, any number of persons may participate in a facilitation session. The practical number of participants is limited only by the number of individual working areas 35 (seen in FIGS. 7 and 8) they can be fitted onto a single display. Furthermore, where the number of working areas 35 are large, in a WINDOWS (Trademark of Microsoft Corporation) environment, the working areas 35 can fill a single window, and the team space 36 another window. In this manner, both can be minimized and maximized to display the selected information on a common display.

Furthermore, it is necessary that those computers (53,55) in the networked system 1, be loaded with the software components 45, 66, (67), 64 and 65 to enable appropriate operation. This can be achieved locally by the local participant "booting" his computer with the appropriate software. Alternatively, after establishing the network connection between the computers 3,53,55, and the host PC (3) is designated, the host PC can then appropriately configure, via the network 51, each of the other computers (53,55), with the appropriate software.

The foregoing describes only a number of embodiments of the present invention, and modifications, obvious to those skilled in the art can be made thereto without departing from the scope of the present invention.

For example, the preferred embodiment can be incorporated into or connected to existing groupware products such as Lotus "Notes". Furthermore, for major presentational purposes, the personal computer can be linked to a large screen monitor or video display wall as the need requires. Also, the facilitation unit 2 can be integrated into the personal computer 3 using expansion sockets as known in the art.

Also, those skilled in the art will appreciate that the facilitator unit 2 can be configured to buffer any number of keyboards 6 to the personal computer 3.

TABLE 1

| | |
|---|---|
| Process Help | F1 (in screen) |
| Function Help | F1 (at main menu) |
| Scroll Help Screens | Arrow Keys, PgUp/PgDown |
| Exit Help Screen | Esc |
| Print 1 copy | F7 |
| Print 8 copies | F8 |
| Select Screen to Print | F6 |
| Exit Screen | Esc or Click Mouse on Close Button |
| Close Window | Esc |
| Display Task | F2 |
| Display Vision | F3 |
| Display Team Profile | F4 |
| Scroll Team Profile | Arrow keys (Up/Down) |
| Display Stakeholders | F5 |
| Scroll Stakeholders | Arrow keys (Up/Down) |
| Record data | Esc from screen |
| Edit data in window | No. 1 keyboard using cursor and text entry keys |

TABLE 2

| | |
|---|---|
| Move around and edit Text | Alphanumeric Keys, Arrow Keys, Ins and Del |
| Clear Playspace | Alt-C |
| Enter your name during Our Team session | Type data and strike Return |
| Transfer data from Playspace to Teamspace | After typing in data strike Return key |
| Move from namespace to data field during Our Team session (and back) | Return |
| Scroll playspace | Arrow Keys (Up/Down) |
| Confirm Data in Playspace | Return |
| Kept Save | Automatic every 500 keystrokes and when leaving a Screen |
| Delete characters to the left of the cursor | Backspace key |
| Delete characters to the right of the cursor | Delete key |

What is claimed is:
1. A communication system comprising:
a plurality of data input devices, each said data input device being operable by a respective person to facilitate communication with each of the other of the respective persons;
at least one computer to which said data input devices are operatively coupled;
a control program stored in said at least one computer and operable to permit data entered respectively on each and any of said data input devices to be transferred to said at least one computer;
at least one display means coupled to said at least one computer and observable by each of said persons, each said display means simultaneously displaying a common image generated by said at least one computer, said common image including a plurality of mutually exclusive display areas with each said input device having a corresponding display area, wherein said data entered by said input devices is substantially simultaneously displayed in the corresponding display area thereby permitting each of the persons to view simultaneously their own entered data and data entered by the other of the persons as said data is entered; and
at least one control device connected to said at least one computer and operable to select specific data displayed in any of said display areas and to facilitate both transfer and display of said specific data to any other display area.

2. A system as claimed in claim 1 wherein said display areas include said corresponding display areas and at least one further display area, said further display area displaying selected specific data transferred thereto from said corresponding display areas using said control device.

3. A system as claimed in claim 1, wherein said control device is selected from the group consisting of a keyboard of the computer, a mouse, and another corresponding device connected to said at least one computer.

4. A system as claimed in claim 1, wherein said control device is configured to manage the operation of said control program.

5. A system as claimed in claim 1, wherein at least one of said data input devices comprises a keyboard.

6. A system as claimed in claim 5 wherein said data input devices are respective keyboards linked to a facilitator unit which acts to buffer signals sourced from said keyboards to said at least one computer.

7. A system as claimed in claim 6, wherein said keyboards are linked to facilitator unit via a wireless link.

8. A system as claimed in claim 7, wherein said wireless link is selected from the group consisting of a radio frequency link and an optical link.

9. A system as claimed in claim 6, wherein said facilitator unit is configured integrally with said at least one computer.

10. A system as claimed in claim 6, wherein said facilitator unit comprises for each said keyboard, a corresponding buffer means adapted to buffer data from said corresponding keyboard onto a common bus, and a control means by which data on said common bus is transmitted to said at least one computer, said data including at least one identifier corresponding to the appropriate one of said keyboards.

11. A system as claimed in claim 1, and further comprising one or more further display means each being controlled by said at least one computer and said control program to display said common image corresponding to that displayed by said one display means for viewing by each one of the persons.

12. A system as claimed in claim 1, wherein associated with each of said corresponding display areas, is a corresponding cursor.

13. A system as claimed in claim 1, wherein one or more of said data input devices comprises a computer device linked to said at least one computer by a data communication network, each said computer device comprising at least one corresponding display means and at least one corresponding data input device, wherein each said corresponding data input device has a corresponding said display area in said common image generated by said at least one computer and which is displayed by each said corresponding display means.

14. A system as claimed in claim 13, wherein said control program comprises a set-up means by which each of said data input devices can be allocated to one said corresponding display area, and a data assimilator and consistency means, adapted to format data received from and transmitted to each said computer device.

15. A system as claimed in claim 6, wherein data input via said keyboards is displayed in said common image on a keystroke-by-keystroke basis.

16. A system as claimed in claim 1, wherein said data entered by each of said input devices is stored in a single file in a memory of said at least one computer, said common image being generated directly from said file.

17. A system as claimed in claim 13, wherein said computer device resides at a location distanced from said at least one computer, and said computer device links a plurality of said data input devices to said computer.

18. A system as claimed in claim 17, wherein said data input devices are linked to said computer device by a facilitator unit.

19. A system as claimed in claim 1, wherein said data input devices comprise respective keyboards linked to a facilitator unit which acts to buffer signals sourced from said keyboards to said at least one computer and wherein data input via each of said keyboards is displayed in said common image on a keystroke-by-keystroke basis.

20. A system as claimed in claim 1, comprising one or more further display means each being controlled by said at least one computer and said control program to display said common image corresponding to that displayed by said at least one display means for viewing by each one of the persons.

21. A system as claimed in claim 1, wherein one or more of said data input devices comprises a computer arrangement linked to said at least one computer by a data communication network, said computer arrangement comprising a computer, at least one corresponding one of said display means and at least one corresponding one of said data input devices, wherein said corresponding one of said data input devices has a corresponding one of said display areas in said single image generated by said at least one computer and which is displayed by each said corresponding one of said display means.

22. A system as claimed in claim 21 wherein said control program comprises a set-up means by which each of said data input devices can be allocated to one said corresponding display area, and a data assimilator and consistency means, adapted to format data received from and transmitted to each said further computer, and wherein said image, being common to each one of said display means, is updated substantially simultaneously via said network with data input from each one of said data input devices.

23. A system as claimed in claim 2, wherein an image displayed by said display means can be selected to display either or both of said corresponding display areas and said further display area.

24. A system as claimed in claim 1, wherein each of said display areas occupies the entire said common image such that said display areas overlap.

25. A method of facilitating communications between a plurality of persons, each having access to a data input device, said method comprising the steps of:
  receiving data simultaneously and separately input from each and any of said data input devices in at least one computer;
  assimilating said data into a file stored within said at least one computer;
  displaying said data by displaying said file as a common image on at least one display means simultaneously observable by each of said persons such that, when initially received, data input from each of said input devices is displayed in a corresponding one of a plurality of mutually exclusive display areas of said image associated with said one input device; and
  manipulating said file to select specific data displayed in any one of said corresponding display areas to transfer said specific data for display in said common image in another display area.

26. A method as claimed in claim 25 wherein said common image is divided to separately display said corresponding display areas and further comprises a further display area into which said selected data from any one or more of said corresponding display areas can be transferred for display.

27. A method as claimed in claim 26 wherein an image displayed by said display means can be selected to display either or both of said corresponding display areas and said further display area.

28. A method as claimed in claim 25 wherein each said corresponding display area occupies the entire said common single image such that said corresponding display areas overlap.

29. A communication system comprising:

a plurality of data entry keyboard devices each being operable by a respective person to facilitate communication with other respective persons;

a facilitator unit coupled to said keyboard devices and configured to buffer signals sourced from said keyboard devices to at least one computer;

at least one display means;

a computer program stored in said at least one computer and operable to generate a common image for simultaneous display one each of said display means, said common image including a plurality of mutually exclusive display areas, with each said keyboard device having a corresponding one of said display areas and there being at least one further display area, the data entered via each said keyboard device being simultaneously displayed in the corresponding display area thereby permitting each of the persons to view simultaneously their own entered data and data entered by others of said persons; and at least one control device connected to said at least one computer and operable to select specific data displayed in said display areas and to instigate both transfer and display of said specific data in any other of said display areas.

30. A method of facilitating structured communications between a plurality of persons at least greater than two, each having access to at least one of a predetermined plurality of data input devices, said method comprising the steps of:

(i) using at least one computer to form a common image on at least one display means simultaneously observable by each of said persons, said common image comprising at least one user display area corresponding to each said input device;

(ii) creating a structured sequence by which said communication is to be interactivity facilitated and presenting at least part of said sequence within said common image;

(iii) displaying said common image simultaneously to each of said persons and, in response thereto;

(iv) receiving data simultaneously and separately input from each and any of said data input devices in at least one computer;

(v) assimilating said data into a file stored within said at least one computer such that, when initially received, data input from any one of said input devices is displayed in a dedicated display area of said common image associated with said one input device; and (vi) manipulating said file to select specific data displayed in any one of said dedicated display areas to transfer said specific data for display in said common image in another display area.

31. A method according to claim 30 wherein step (ii) of creating a structured sequence comprises step (iv).

32. A method according to claim 30 wherein step (ii) of creating a structured sequence comprises retrieving a predetermined structured communication sequence.

33. A method according to claim 32 wherein said predetermined structured communication sequence is amended using step (iv).

* * * * *